United States Patent
Trainin

(10) Patent No.: US 7,155,542 B2
(45) Date of Patent: Dec. 26, 2006

(54) DYNAMIC NETWORK INTERFACE WITH ZERO-COPY FRAMES

(75) Inventor: Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 09/893,947

(22) Filed: Jun. 27, 2001

(65) Prior Publication Data

US 2003/0005164 A1 Jan. 2, 2003

(51) Int. Cl.
*G06F 3/00* (2006.01)
*G06F 15/16* (2006.01)

(52) U.S. Cl. .................... 710/29; 710/52; 709/232
(58) Field of Classification Search ................ 710/29, 710/52; 709/232, 233, 234, 235, 251
See application file for complete search history.

(56) References Cited

U.S. PATENT DOCUMENTS

| 6,247,060 | B1 * | 6/2001 | Boucher et al. ............ 709/238 |
| 6,347,337 | B1 * | 2/2002 | Shah et al. ................. 709/224 |
| 6,434,620 | B1 * | 8/2002 | Boucher et al. ............ 709/230 |
| 6,907,042 | B1 * | 6/2005 | Oguchi ....................... 370/412 |

* cited by examiner

*Primary Examiner*—Kim Huynh
*Assistant Examiner*—Alan S. Chen
(74) *Attorney, Agent, or Firm*—Erik M. Metzger

(57) ABSTRACT

A dynamic network interface is described, intended to enable the efficient processing of received data within a computer network by a target computer system by reducing excessive copying of the received data prior to being accessed by a network software application.

9 Claims, 6 Drawing Sheets

| 31 | 24 | 23 | 16 | 15 | 8 | 7 | 0 | COMMENTS |
|---|---|---|---|---|---|---|---|---|
| 0 | | 0 | | BC | | BC | | MESSAGE'S BYTE COUNT |

| 31 | 24 | 23 | 16 | 15 | 8 | 7 | 0 | COMMENTS | |
|---|---|---|---|---|---|---|---|---|---|
| BYTE 3 | | BYTE 2 | | BYTE 1 | | BYTE 0 | | MAC HEADER, IP HEADER, TCP/UDP HEADER, | 405 |
| BYTE 7 | | BYTE 6 | | BYTE 5 | | BYTE 4 | | | |
| BYTE 11 | | BYTE 10 | | BYTE 9 | | BYTE 8 | | | |
| ... | | ... | | ... | | ... | | | |
| BYTE 1 | | BYTE 0 | | BYTE N | | BYTE N-1 | | MERGE OF HEADER AND DATA | |
| BYTE 5 | | BYTE 4 | | BYTE 3 | | BYTE 2 | | DATA | 410 |
| BYTE 7 | | BYTE 6 | | BYTE 5 | | BYTE 4 | | | |
| ... | | ... | | ... | | ... | | | |
| X | | X | | X | | BYTE N | | | |
| CL STATUS | | 1010 0000 | | STATUS (CSMA+) | | | | RCV STATUS | |

| 31 | 24 | 23 | 16 | 15 | 8 | 7 | 0 | COMMENTS |
|---|---|---|---|---|---|---|---|---|
| 0 | | 0 | | BC | | 'hC | | MESSAGE'S BYTE COUNT |

| N/A | RCV PARS. STATUS | VLAN TAG | FIRST ADDITIONAL STATUS |
|---|---|---|---|
| Z/C STATUS | XSUM STATUS | RCV SEC. STATUS | SECOND ADDITIONAL STATUS |
| N/A | 1010 0101 | N/A | END STATUS |

ZC FRAME IN INBOUND QUEUE

FIG. 4

RFD STRUCTURE

DYNAMIC NETWORK INTERFACE WITH ZERO-COPY FRAMES

FIELD OF THE INVENTION

The invention described herein relates to the field of computer networks. More particularly, the invention relates to a network interface protocol.

BACKGROUND

High-speed computer network topologies, such as Local Area Networks (LAN) and Wide Area Network (WAN), demand increasing bandwidth and data throughput. Consequently, data traveling across high-speed computer networks may "bottleneck" once the data is received by a Network Interface Card (NIC) within a target computer system. In order to accommodate continued increases in LAN/WAN network bandwidth, bottlenecks within the network must be prevented.

One reason data may bottleneck in a NIC is because the network interfaces used in current NICs may be inefficient in the way in which they handle incoming data. For example, a prior art network interface handles incoming data by relying on a NIC software driver to retrieve data from a temporary receiving buffer and store the data into a protocol memory before storing the data to application memory. Network software applications may then access the data from the application memory. Such a network interface involves numerous intermediate copying operations that take time and may cause network throughput to bottleneck.

BRIEF DESCRIPTION OF THE DRAWINGS

The features and advantages will become apparent from the following detailed description in which:

FIG. 4 illustrates the contents of an incoming frame of data.

DETAILED DESCRIPTION

A dynamic network interface is described, intended to enable the efficient processing of received data within a computer network by a target computer system by reducing excessive copying of the received data prior to being accessed by a network software application.

A Computer Network

Figure 1:
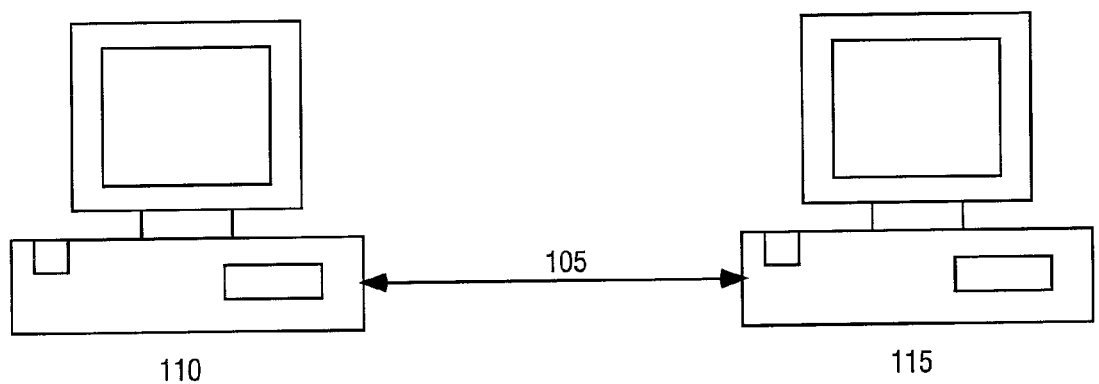
FIG. 1 illustrates a computer network according to one embodiment.

FIG. 1 illustrates a computer network according to one embodiment.

Computer systems may communicate over a network 105, such as a Local Area Network (LAN) or Wide Area Network (WAN), depending on the relative location and requirements of the computer systems within a network. Accordingly, data may be transmitted across a network via a wired connection, such as T1 or twisted pair, or by wireless means, such as a Radio Frequency (RF) signal.

A target system 115 is any computer system that is the destination of data transmitted across a network. A source computer system 110 may transmit data to the target computer system either after the data has been requested by the target computer system, or the source computer system may transmit data unsolicited by the target computer system. In either case, data sent to a target computer system by a source computer system is stored within the target computer system, at least temporarily, in order to allow software programs, such as a network software application, to access the data.

A Network Interface Sub-System

Data received by a target computer system may be copied from the target computer system to other locations within the receiving host computer system or other computer system in order to make the received data accessible to data processing software or hardware, such as a network software application.

Data sent to a target computer system may be received by a network interface sub-system where it may be copied from a temporary storage device, such as buffer memory, to Application Memory (AM) in order to allow a network software application to access the data. AM is a location of memory that has been dedicated, either permanently or temporarily, to a network software application. Data stored within AM may then be accessed by a network software application running on the host computer system.

Figure 2:
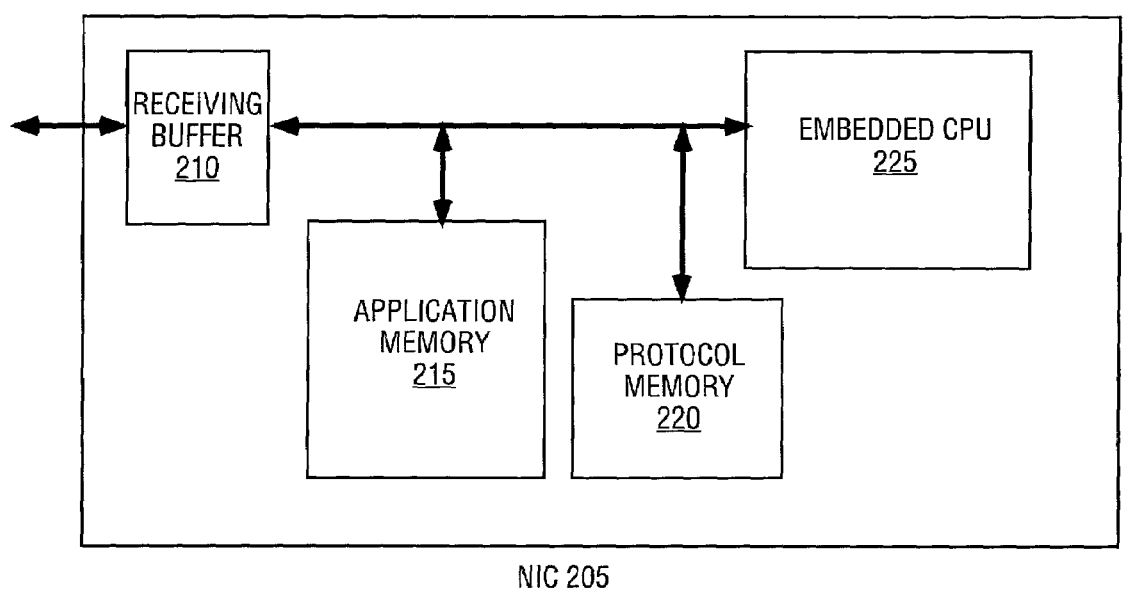
FIG. 2 illustrates a Network Interface Card (NIC) according to one embodiment.

In one embodiment, the network interface sub-system is a Network Interface Card (NIC). FIG. 2 illustrates an NIC according to one embodiment. In one embodiment, a NIC 205 consists of an embedded processor 225, embedded memory 230 and a receiving buffer 210. A receiving buffer may be used to temporarily store received data until the data can be copied or transferred to another location within the NIC or host computer system. Received data may then be copied to driver memory 220 where it may be accessed by software programs, such as a software driver, that control the NIC and subsequently copied to application memory 215. Application memory may be used to store the received data in order to allow a network software application to access it.

Device memory and application memory may exist within the same physical memory device or in separate memory devices. In one embodiment, application memory and device memory are allocated within system memory of the host target computer system, whereas the temporary receiving buffers are located in the NIC.

Once data is received by a NIC, an embedded processor may process the received data in order for a software application to access the data. For example, received data temporarily stored in a receiving buffer may be copied to device memory by a software driver running on the host system. The software driver may then copy the data to an application memory space where it may be accessed by a software application running on the host computer system.

A Dynamic Network Interface

A dynamic network interface is described herein, in which application software may access data received by a target computer system without waiting for the data to be copied by a software driver or other program to intermediate memory locations, such as device memory, before being stored to application memory.

In one embodiment, frames of data within a messaging flow, such as a Transmission Control Protocol (TCP) flow, are temporarily stored within a receiving buffer and then stored into buffers within application memory (AM) buffers that have been allocated by one or more network software applications. A messaging flow refers to one or more frames of data that are intended to be received by a particular computer system for use by a software application running on the receiving computer system.

A network software application may access received data frames stored in the AM buffers without having to wait for the data to be copied to an intermediate memory location and subsequently stored into application memory. Frames of data that are stored to application memory in such a manner are referred to as "Zero Copy" (ZC) frames, as the frames require no intermediate copying or transferring prior to being stored within application memory. Accordingly, a portion of a messaging flow to which a ZC frame belongs is referred to as a ZC flow, while an AM buffer in which ZC frames are stored are referred to as a ZC AM buffer.

In one embodiment, frames received by the target computer system may be determined to be ZC frames by a device driver running on the host computer that controls the NIC hardware. Once the device driver has determined that the received frame may be processed as a ZC frame, embedded software running on the NIC may configure the frame as a ZC frame and copy the data from the receiving buffer to a ZC AM buffer or buffers.

After it is determined that a frame of data may be "zero copied" to application memory, one or more circular Receiving Buffer Descriptor (RBD) queues may be created and a predetermined number of RBD's allocated within. Each RBD entry may contain at least a value corresponding to a start address and a value indicating the size of a ZC AM buffer to which an RBD corresponds. In one embodiment, the value corresponding to a start address is the start address of the corresponding ZC AM buffer within application memory. In other embodiments, the value may be an offset, sequence number, or other value from which the address of a ZC AM buffer may be derived. Furthermore, when a new ZC AM buffer is allocated within application memory, a new RBD entry may be stored within an available RBD queue entry or one that later becomes available.

Figure 3:
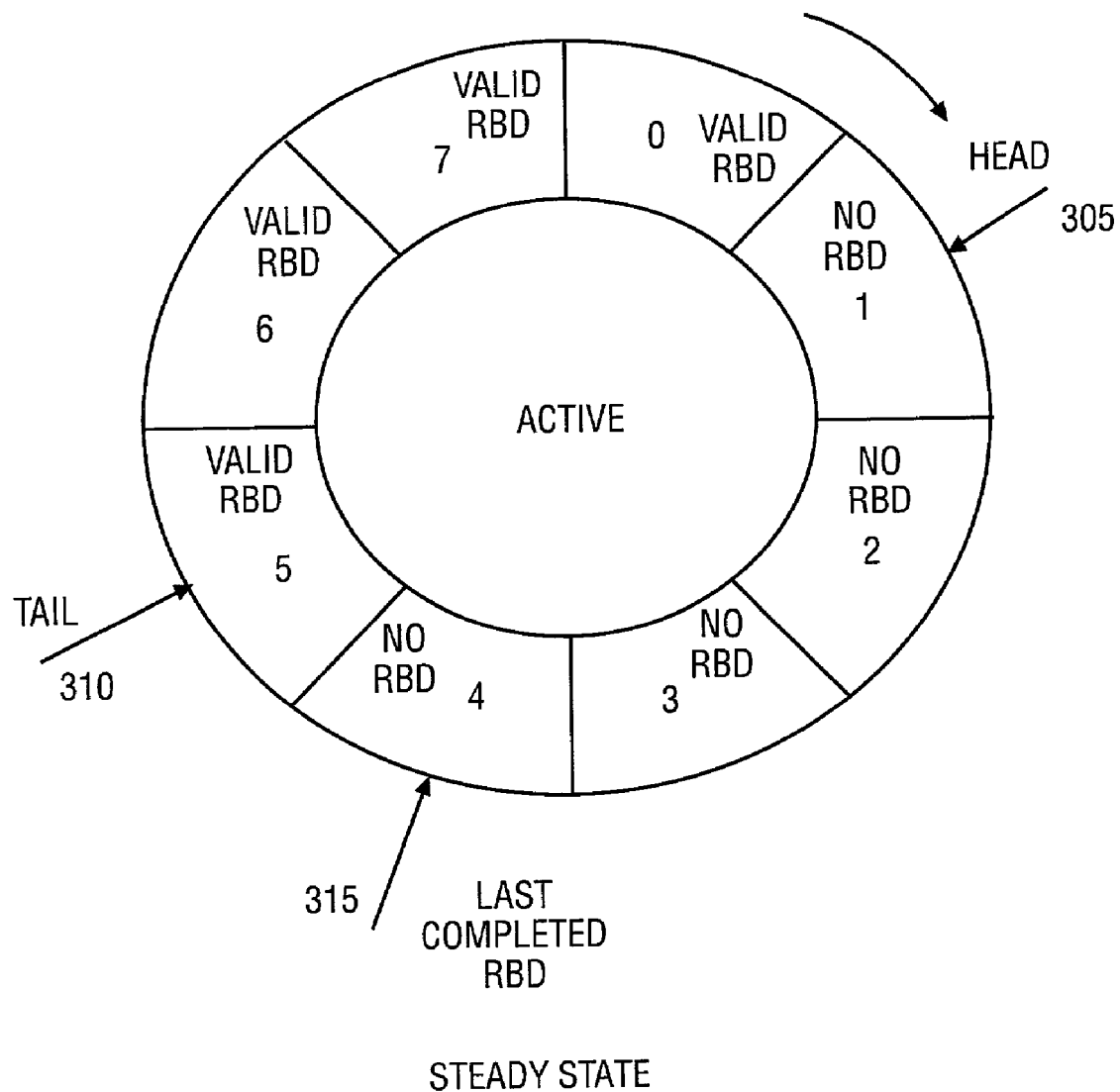
FIG. 3 illustrates an RBD queue according to one embodiment.

FIG. 3 illustrates an RBD queue according to one embodiment. A next available RBD queue entry may be indicated by a Head Pointer 305, whereas an oldest incomplete RBD queue entry may be indicated by a Tail Pointer 310. Once a ZC AM buffer has been filled, an RBD corresponding to the filled ZC AM buffer may be indicated by a Last Completed RBD Number (LCRN) pointer 315. The LCRN pointer may be communicated to a NIC device driver in order to inform the device driver that the ZC AM buffer is full and will be de-allocated. The device driver may use this information to keep track of available AM buffers in order to process non-ZC frames. The RBD corresponding to the filled ZC AM buffer may then be de-allocated, allowing other pending or future RBD's to be stored within the queue. In one embodiment, a fulfilled RBD is de-allocated by invalidating the RBD through incrementing of the Tail Pointer.

Upon receiving a frame of data into the receiving buffers of a receiving host computer system's NIC, it may be determined whether the data is intended for the receiving host computer. In one embodiment, a network software application running on the target host computer system determines whether a received frame is intended for the target host computer and whether it is intended to be processed by the network software application. This information may be obtained by interpreting header information associated with the received frame.

Received frames may arrive in various network protocols, including TCP. In general, a flow of TCP frames may be identified by using various header parameters associated with the protocol. For example, in one embodiment, Internet Protocol (IP) Source Address, IP Destination Number, Destination Port Number, and Source Port number may be used to identify TCP frames of a particular flow as being intended for the receiving computer system.

When a new frame of data is received and the receiving host computer system determines that the frame is intended for the receiving host computer system, it is then determined whether the frame may be treated as a ZC frame and therefore copied directly from receiving buffers within the receiving host computer NIC to application memory without intermediate copying steps. In one embodiment, a received frame of data within a TCP flow is "zero copied" to application memory if there is enough space for the frame within any of a group of allocated ZC AM buffers, and if not, new ZC AM buffers may be allocated.

If it is determined that the received frame may be "zero copied" to an existing ZC AM buffer within application memory then the data is copied directly into the available ZC AM buffer(s). If all allocated ZC AM buffers are unable store the received frame and available space within the RBD queue exists, a new ZC AM buffer may be allocated and the corresponding RBD placed in the RBD queue, thereby enabling a new ZC flow of ZC frames.

In one embodiment, a flow descriptor is created that corresponds to a newly enabled ZC flow. A flow descriptor may contain flow control fields and RBD array status information pertaining to a ZC flow, which may be used by embedded software or other software/hardware within the target computer system to retrieve status information pertaining to the ZC flow or to identify the ZC flow.

Various fields may be stored within the flow descriptor using various bit lengths to represent each field. In one embodiment, the flow descriptor contains a 4-bit Flow Identification Number, a 1-bit Internet Protocol (IP) type, a 32 or 128-bit IP Source Address, a 32 or 128-bit IP Destination Address, a 16-bit Destination Port Number, a 16-bit Source Port Number, a 32-bit Start Sequence Number, a 1-bit TCP/UDP number, and an RBD Array Pointer. Any one or combination of these fields may be used to identify and recognize a particular flow. In addition, the flow descriptor may contain an RBD Array indicating the number of RBD's within an RBD queue, and the number RBD's associated with frames within a ZC flow. Other fields may also be stored within the flow descriptor in other embodiments.

Once a ZC flow descriptor is created and at least one ZC AM buffer is allocated within application memory, ZC frames that were temporarily stored in receiving buffers may be stored in the allocated ZC AM buffers corresponding to a particular ZC flow. Once an ZC AM buffer is allocated, values corresponding to the buffer's start address and size are then stored within an available RBD, which is indicated by a Head Pointer within the RBD queue.

FIG. 4 illustrates the contents of an incoming frame of data. Each received frame in a flow may contain a header 405 and a payload 410. The payload is the actual data that will be used by application software, whereas the header contains information relating to the particular received frame of data and the flow to which it belongs. After allocating an ZC AM buffer and storing the buffer's start address and size into an RBD, the payload of a received ZC frame is stored within the allocated ZC AM buffer. A header associated with the ZC frame is stored within a Receiving Frame Descriptor (RFD), which is stored in an RFD pool with other RFD's corresponding to other received frames. An RFD may be used to identify a particular frame.

Figure 5:
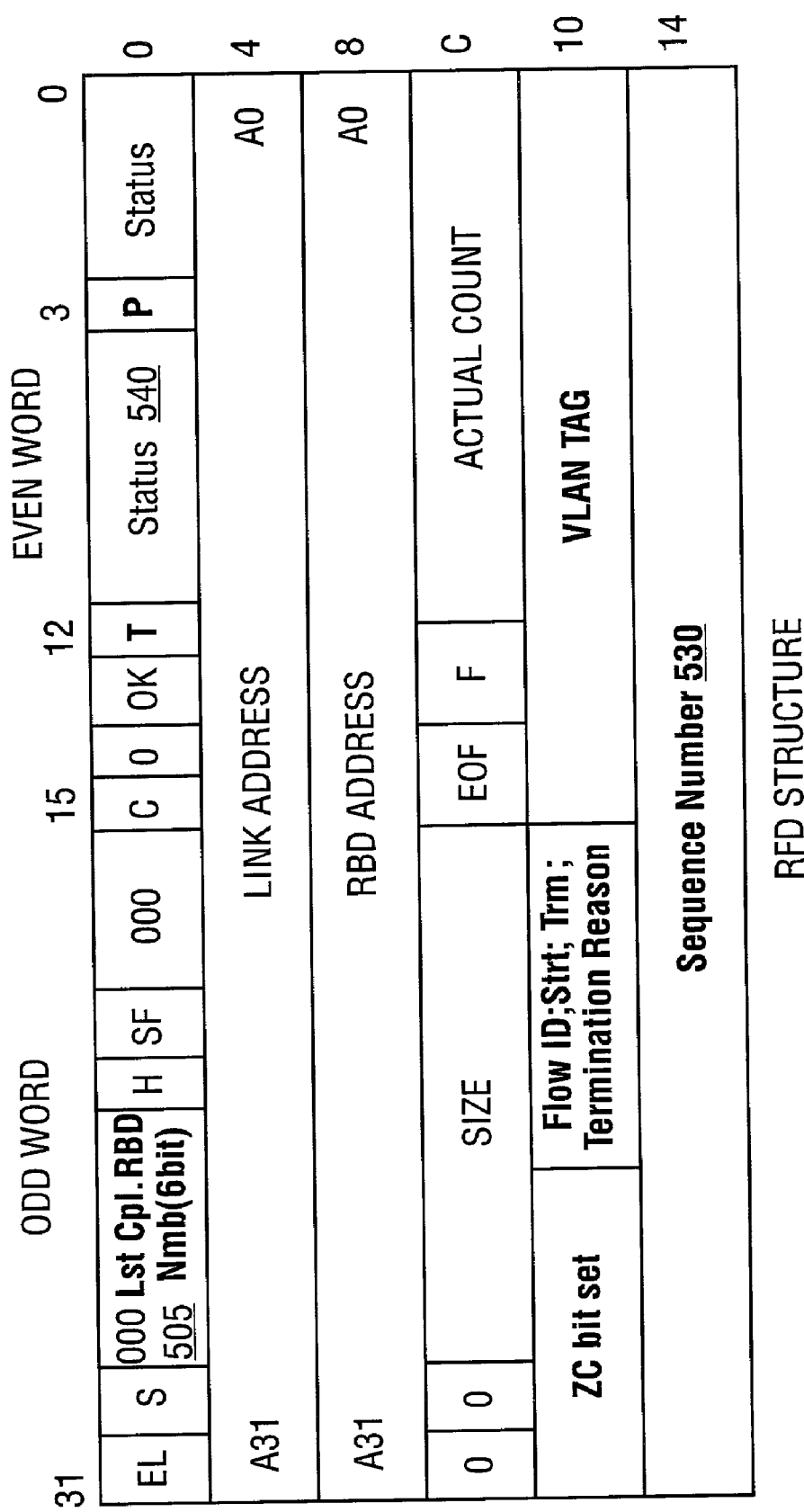
FIG. 5 illustrates fields that may be stored within a Receiving Frame Descriptor (RFD) corresponding to a received frame of data.

FIG. 5 illustrates fields that may be stored within an RFD corresponding to a received frame of data. Each newly received frame of data—ZC frame or otherwise—may store its header information in an RFD. In one embodiment, an RFD contains a 6-bit Last Complete RBD Number (LCRN) 505, a 4-bit Flow Identification Number 510, a 32-bit Sequence Number 530, a 1-bit flag to indicate that a flow has started 515, a 1-bit flag to indicate that a flow has terminated 520, and a 2-bit number to indicate the reason for termination 525.

The 32-bit sequence number may indicate a start sequence number, if the start bit is set, and an end sequence number, if the terminated bit is set. Furthermore, sequence numbers may identify relative position of a byte or group of bytes within a received frame of data in a particular flow. Accordingly, RFD structures may be used by a device driver controlling the NIC hardware to determine whether a frame of data has been configured as a ZC frame. A device driver may then determine whether the frame data should be ignored (if it is a ZC frame) or whether to retrieve the frame data (if the data is a non-ZC frame) and store it into device memory or some other memory from which it may be copied into application memory.

If a ZC bit 540 is set within an RFD, the device driver, in one embodiment, may also use the RFD to 1) check the flow corresponding to the flow ID within the RFD, 2) Release the RBD referenced by the LCRN pointer, 3) calculate the number of remaining valid RBD's in the RBD queue, and 4) determine whether new RBD content should be supplied to embedded software running on the NIC by determining whether the number of valid RBD's in the queue is less than some predetermined number.

One Embodiment of a Dynamic Network Interface

Figure 6:
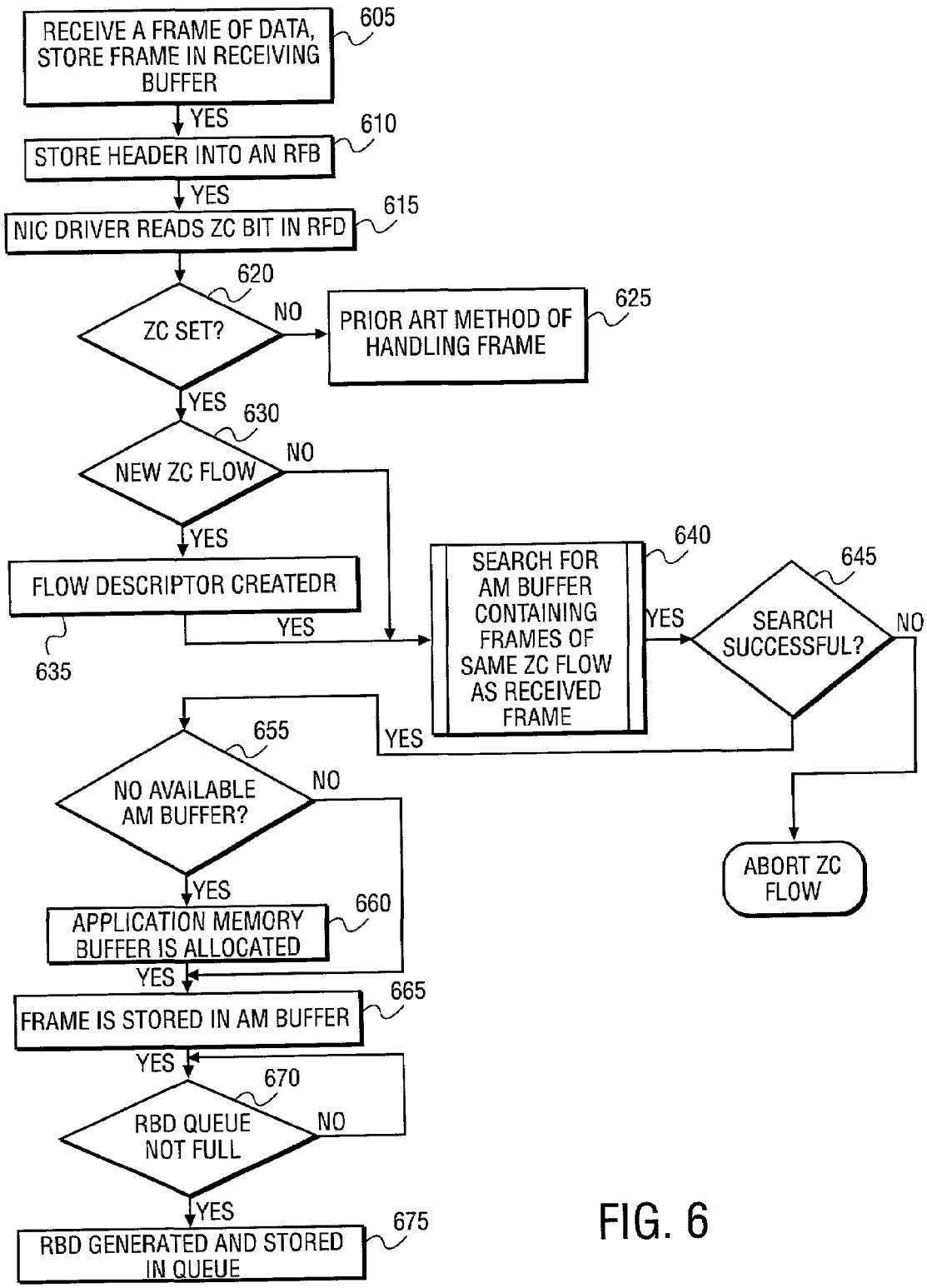
FIG. 6 is a flow diagram illustrating the operation of a dynamic network interface according to one embodiment.

FIG. 6 is a flow diagram illustrating the operation of a dynamic network interface according to one embodiment. After the host computer determines that the received data frame is intended for an application software program running on the host computer 605, the header information associated with the received frame of data is stored within an RFD 610.

A determination may then be made as to whether the received frame may be "zero copied" directly to application memory from a receiving buffer. A received buffer may be "zero-copied" to application memory if available ZC AM buffer space exists 615. If not, 620 the received frame may be "zero-copied" to application memory if there is enough room in the RBD queue for a new ZC AM buffer to be allocated in application memory.

If the received frame cannot be stored into an existing ZC AM buffer and there is no space within the RBD queue for a new zero-copy AM buffer to be allocated within application memory, a prior art method 625 of handling the received frame is invoked. A prior art method may involve methods that do not support storing the received frame directly to application memory after it is received in a receiving buffer, but instead may invoke other intermediate copying operations. If there is enough space in an existing ZC AM buffer or buffers, the received frame data is stored in the available ZC AM buffer or buffers and the corresponding RFD zero-copy bit is set to indicate that the frame is a zero-copy frame 630.

In order to find an available ZC AM buffer to store the received data, a search is conducted among a pre-determined number RBD's, each corresponding to a particular ZC AM buffer. In one embodiment, the search is based on a sequence number and size of the received frame data stored within each RBD. The sequence number is used to calculate an AM buffer's offset address and the data size is used to determine whether there is enough space in the ZC AM buffer for received data. A successful search identifies an ZC AM buffer address derived from the frame sequence number that is able to contain the received frame data. A search fails and is aborted if no such ZC AM buffer can be identified.

In one embodiment, the search may be aborted if the number of searched ZC AM buffers exceeds the predefined number, thus aborting the ZC flow itself. If the ZC flow is aborted, this may be reflected within the RFD associated with the received frame by setting a termination bit and an appropriate termination reason field.

If it is determined that there is no space for the received frame data in existing zero-copy ZC AM buffers, a new ZC AM buffer may be allocated to store the received frame data as a zero-copy frame. In one embodiment, a new ZC AM buffer is allocated if there is an available RBD queue entry in which to store an RBD associated with the newly allocated ZC AM buffer. If the RBD queue is full, prior art methods are used to copy the received data to application memory that may involve intermediate copying steps. If there is available space within the RBD queue, a new zero-copy AM buffer is allocated 635 and a corresponding RBD is placed within the RBD queue. The data may be stored within the newly-allocated ZC AM buffer and the RFD updated to reflect that the received frame is a ZC frame 640. A ZC flow descriptor may also be created to indicate that a new ZC flow has begun 645.

When a ZC AM buffer is fulfilled 650, a corresponding LCRN pointer within the RBD queue may be used to inform a software program, such as a NIC device driver, that the corresponding RBD queue entry is available to receive a new RBD. Accordingly, this information may be communicated to software controlling the zero-copy operation, such as embedded software running on the NIC, to invalidate the RBD corresponding to the fulfilled AM buffer so that the RBD queue entry may be used to hold future or pending RBD's 655.

While this invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed:

1. A method comprising:
    receiving a frame of data transmitted across a network into a receiving buffer of a target computer system;
    recognizing and initiating a copy of said frame of data, said initiating comprising identifying at least one available Application Memory (AM) buffer in which to store a payload of said frame of data;
    storing a header of said frame of data to a Receiving Frame Descriptor (RFD), said header comprising at least one sequence number;
    zero-copying said payload of said received frame of data to said at least one AM buffer, wherein said zero-copying is aborted if an available Receiving Buffer Descriptor (RBD) queue entry is not identified.

2. The method of claim 1 further comprising allocating a new AM buffer if at least one available AM buffer is not identified, said allocating comprising creating a Receiving Buffer Descriptor (RBD) within an available RBD queue entry, said RBD comprising a value corresponding to a start address and a value corresponding to a size of said new AM buffer.

3. The method of claim 2 further comprising creating a flow descriptor if said new AM buffer is allocated, said flow descriptor identifying a zero-copy flow.

4. The method of claim 2 wherein said identifying comprises searching a pre-defined number of RBD's within said RBD queue for an RBD corresponding to said at least one available AM buffer.

5. The method of claim 4 wherein said search is based on a difference between a an AM buffer size and a size of said payload of said frame of data.

6. The method of claim 5 wherein said search is aborted if said search is unsuccessful after searching said predefined number of RBD's within said RBD queue.

7. The method of claim 6 wherein said RBD queue is indexed by a head pointer, a tail pointer and a Last Completed RBD Number (LCRN) pointer, said head pointer comprising a value corresponding to an address of a next available RBD entry within said RBD queue and said tail pointer comprising a value corresponding to an address of an oldest incomplete RBD within said RBD queue and said LCRN pointer comprising a value corresponding to a full AM buffer.

8. The method of claim 7 wherein an RBD entry within said RBD queue corresponding to a full AM buffer is invalidated.

9. The method of claim 8 wherein said invalidated RBD entry is used to store future or pending RBD's.

* * * * *